(12) United States Patent
Jih-Yung

(10) Patent No.: US 6,532,341 B2
(45) Date of Patent: Mar. 11, 2003

(54) LENS CAP TRANSMISSION APPARATUS WITH CLOSE-UP AND START-UP FUNCTIONS

(75) Inventor: Lu Jih-Yung, Sanchung (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/046,086

(22) Filed: Jan. 16, 2002

(65) Prior Publication Data
US 2002/0094201 A1 Jul. 18, 2002

(30) Foreign Application Priority Data
Jan. 18, 2001 (TW) ........................................ 90101197 A

(51) Int. Cl.$^7$ ............................................. G03B 17/00
(52) U.S. Cl. ......................................... 396/72; 396/448
(58) Field of Search .............. 396/72, 448; 348/240.99, 348/240.3, 373

(56) References Cited

U.S. PATENT DOCUMENTS

| | | | | |
|---|---|---|---|---|
| 3,798,670 A | * | 3/1974 | Tanaka ................... | 396/448 X |
| 4,280,762 A | * | 7/1981 | Prochnow ............... | 396/448 X |
| 4,363,546 A | * | 12/1982 | Enomoto et al. ........ | 396/448 X |
| 5,051,765 A | * | 9/1991 | Yoshizaki et al. ...... | 396/448 X |

* cited by examiner

*Primary Examiner*—W. B. Perkey
(74) *Attorney, Agent, or Firm*—Rabin & Berdo, PC

(57) ABSTRACT

A lens cap transmission apparatus with close-up and start-up functions is disclosed. The apparatus is equipped in a camera, the camera including a lens and a lens cap. The lens includes a lens pull rod for adjusting the focal length of the lens. The lens cap is coupled to the camera by a fixed spindle and includes a lens cap pull rod. The apparatus comprises a lens cap frame and a lens frame. The lens cap frame is coupled to the lens cap pull rod and the lens frame is coupled to the lens pull rod. The lens cap transmission apparatus can move back and forth along a coordinate axis. When the apparatus is activated, the lens cap frame and lens frame can respectively open the lens cap and rotate the lens, directly enabling the camera to be in the open mode and the close-up mode, respectively. The apparatus of the invention can provide easy usage and achieve the design of saving inner camera space and reducing material cost.

9 Claims, 3 Drawing Sheets

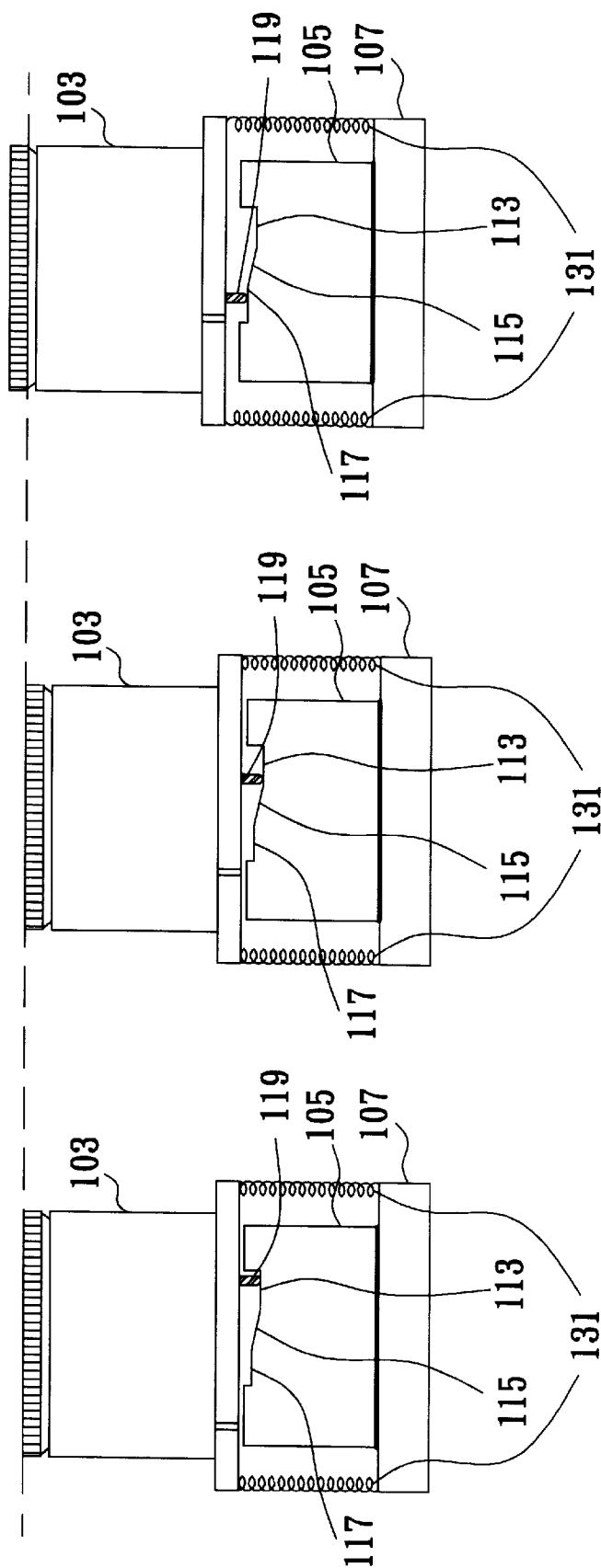

LENS CAP TRANSMISSION APPARATUS WITH CLOSE-UP AND START-UP FUNCTIONS

BACKGROUND OF THE INVENTION

This application incorporates by reference Taiwanese application Serial No. 90101197, Filed Jan. 18, 2001.

1. Field of the Invention

The invention relates in general to an improved camera mechanism, and more particularly, to a lens cap transmission apparatus capable of directly switching to the close-up function of a camera by controlling the lens cap.

2. Description of the Related Art

Nowadays, when people try to keep the memory of a wonderful moment, a camera is frequently utilized to capture the image of the wonderful scenery or person. Usually, the common camera has a lens cap to protect the lens from damage and from dust pollution. When the lens cap covers the lens, the camera is in a close mode. And before taking a picture, the user must turn on the camera by pressing an open/close button to uncover the lens cap from the lens. The camera is then switched to an open mode and is ready for the user to take a picture.

In addition, the camera provides a close-up mode for the user to photograph shorter-distance objects. The user can press the close-up function button to adjust the focal length of the lens and set the camera in a close-up mode. Generally, the traditional camera has one button for controlling the open/close mechanism and another one button for controlling the close-up mechanism. As a result, the user must manipulate two buttons: one is the open/close function button to turn the camera on/off and another one is the close-up function button to switch the camera into the close-up mode. These two buttons are separate, and operating the separate mechanisms is inconvenient for the user. Furthermore, the mechanisms for these buttons occupy more inner space of the camera.

SUMMARY OF THE INVENTION

It is therefore an object of the invention to provide a lens cap transmission apparatus with close-up and start-up functions. The lens cap transmission apparatus operates the lens cap to engage the camera in the open mode, and because the said apparatus is also coupled to the lens, it can adjust the focal length of the camera and directly switch the camera to the close-up mode. Thus, the lens cap transmission apparatus allows the user to achieve the above two functions simultaneously. And the structural design of the apparatus can reduce the inner space requirement of the camera, and moreover, economizes the material cost.

The invention achieves the above-identified objects by providing a lens cap transmission apparatus with close-up and start-up functions. The lens cap transmission apparatus is equipped in a camera and the camera includes a lens and a lens cap. The lens includes a lens pull rod for adjusting the focal length of the lens. The lens cap is coupled to the camera by a fixed spindle and includes a lens cap pull rod. The lens cap transmission apparatus comprises a lens cap frame and a lens frame. The lens cap frame is coupled to the lens cap pull rod, and the lens frame is coupled to the lens pull rod. The lens cap transmission apparatus can move back and forth along a coordinate axis, wherein the coordinate axis comprises a close location, an open location, and a close-up location. The lens cap transmission apparatus is characterized in that when the lens cap transmission apparatus is positioned at the close location, the lens cap covers the lens and the camera is in a close mode, when the lens cap transmission apparatus is positioned at the open location, the lens cap is uncovered from the lens and the camera is in an open mode, and when the lens cap transmission apparatus is positioned at the close-up location, the camera is in a close-up mode.

BRIEF DESCRIPTION OF THE DRAWINGS

Other objects, features, and advantages of the invention will become apparent from the following detailed description of the preferred but non-limiting embodiments. The description is made with reference to the accompanying drawings, in which:

FIG. 3A is a lateral sketch diagram of the lens coupled to the base of the camera of FIG. 1 in the close mode;

FIG. 3B is a lateral sketch diagram of the lens coupled to the base of the camera of FIG. 1 in the open mode; and FIG. 3C is a lateral sketch diagram of the lens coupled to the base of the camera of FIG. 1 in the close-up mode.

DESCRIPTION OF THE PREFERRED EMBODIMENT

Figure 1:
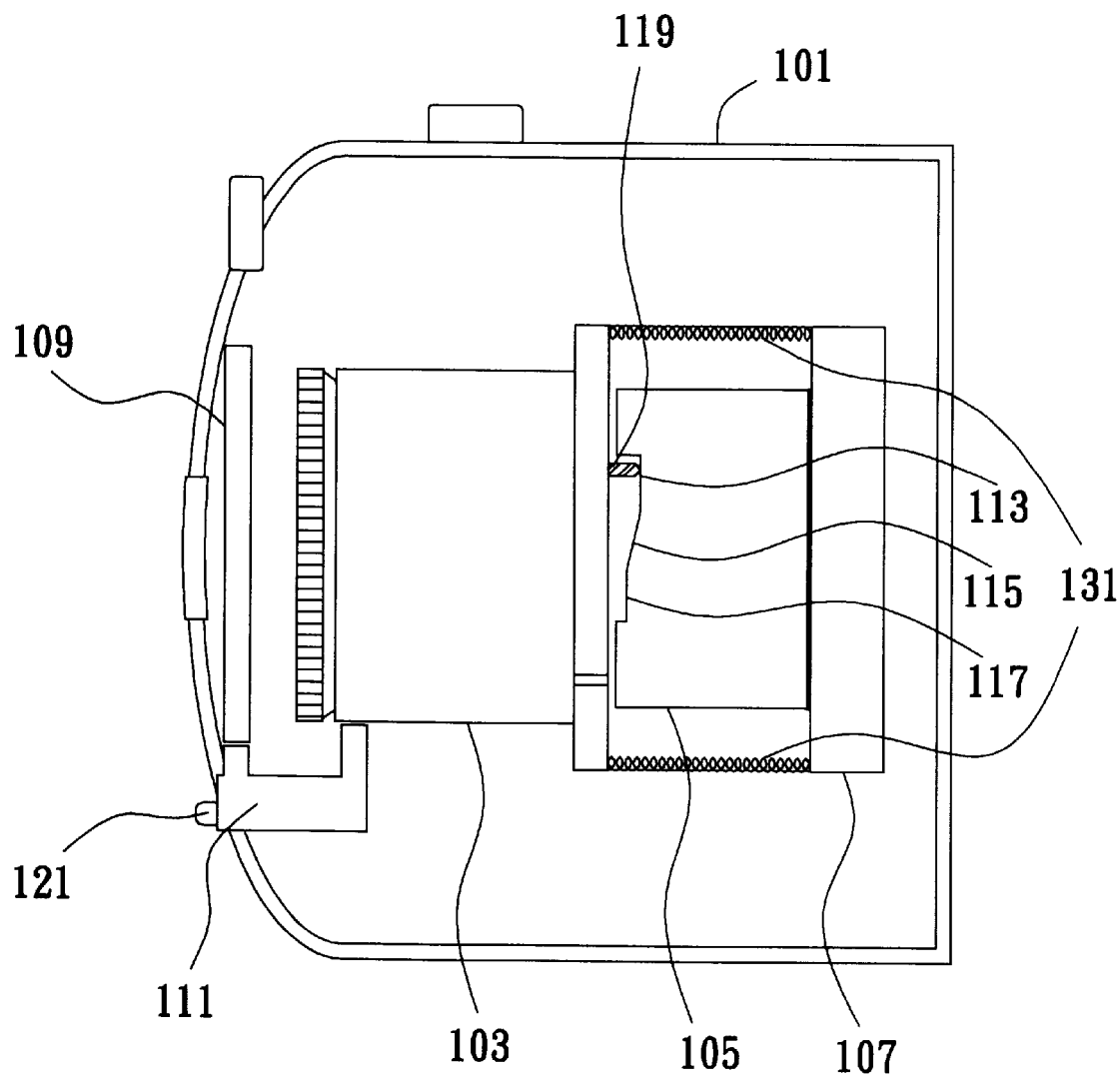
FIG. 1 is a lateral structural diagram of a lens cap transmission apparatus equipped in a camera according to a preferred embodiment of the invention.

Referring first to FIG. 1, it shows a lateral structural diagram of a lens cap transmission apparatus equipped in a camera according to a preferred embodiment of the invention. In FIG. 1, the camera 100 includes a body 101, a lens 103, a base 105, a light-sensing component 107, a lens cap 109 and a lens cap transmission apparatus 111. The concept of capturing an image by the camera 100 is that light enters the camera through the lens 103 and is focalized. The focalized light then goes through the base 105 and is received by the light-sensing component 107 for imaging. And the camera 100 can be a camera that uses film for imaging, or a digital camera. As shown in FIG. 1 the camera 100 further comprises a spring 131, which secures the lens 103 and the light-sensing component 107.

The lens 103 can be rotated to move along the direction of the axis of the focalized light. The design of the mechanism for rotating the lens 103, in order to adjust the focal length, is as follows. The side of the base 105 is coupled to the lens 103 and includes a low plane 113, an inclined plane 115, and a high plane 117. And the depth of the low plane 113 (the distance between the lower plane 113 and the lens 103) is greater then the depth of the high plane 117 (the distance between the high plane 117 and the lens 103).

Furthermore, the lens includes a post 119. When the lens 103 is rotated, the post 119 is promoted to move on the low plane 113, the inclined plane 115, or the high plane 117. When the post 119 moves from the low plane 113 to the high plane 117, the post 119 shores up the high plane 117 enabling the lens 103 to move along the direction of the axis of the focalized light, in order to increase the focal length of the camera 100. And when the post 119 moves from the high plane 117 to the low plane 113, the elasticity of the spring 131 enables the lens 103 to be nearer to the light-sensing component 107, thus decreasing the focal length of the camera 100. As a result, the focal length can be adjusted by rotating the lens 103.

Figure 2A:
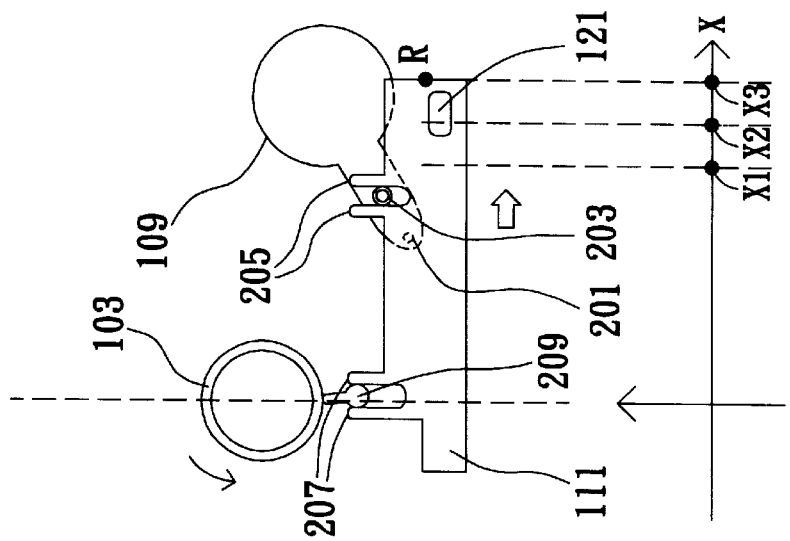
FIG. 2A is a sketch diagram of the lens cap transmission apparatus coupled to the lens cap and the lens when the camera of FIG. 1 is in the close mode.

The camera 100 includes a close mode, an open mode and a close-up mode. The invention manipulates the movement of the lens cap transmission apparatus 111 to control both the lens cap 109 and the lens 103 in order to switch among the above modes of the camera 100. Referring to FIG. 2A, it is a sketch diagram of the lens cap transmission apparatus 111 coupled to the lens cap 109 and the lens 103 when the camera 100 of FIG. 1 is in the close mode. In FIG. 2A, the lens 103 includes a lens pull rod 209, and the lens pull rod 209, when pushed, enables the lens 103 to rotate. The lens cap 109 assembly includes a fixed spindle 201 and a lens cap pull rod 203. The lens cap 109 is coupled to the body 101 by the fixed spindle 201. When the lens cap pull rod 203 is pushed, the lens cap 109 pivots upon the fixed spindle 201.

The lens cap transmission apparatus 111 is movably equipped in the body 101. The lens cap transmission apparatus 111 includes a lens cap frame 205 and a lens frame 207. The lens cap frame 205 is coupled to the lens cap pull rod 203, and the lens frame 207 is coupled to the lens pull rod 209. When the lens cap transmission apparatus 111 is activated, the apparatus 111 can promote both the lens cap 109 and the lens 103 to rotate simultaneously. The lens cap transmission apparatus 111 further includes a push button 121. The push button 121 is located outside of the body 101 and is pushed by a user to operate the lens cap transmission apparatus 111.

Simultaneously referring to FIGS. 2A, 2B, 2C, 3A, 3B, and 3C, the lens cap transmission apparatus 111 can move back and forth along a coordinate axis X. If the point R on the lens cap transmission apparatus 111 is taken as a reference point, there are a close location X1, an open location X2, and a close-up location X3 on the coordinate axis X. The purpose of these locations is that when the lens cap transmission apparatus 111 is activated, the reference point R is moved to the close location X1, the open location X2, or the close-up location X3 to set the camera 100 in a close mode, an open mode or a close-up mode, respectively.

Firstly, as shown in FIGS. 2A and 3A, the reference point R is positioned at the close location X1, and the lens cap 109 exactly covers the lens 103. The camera 100 is in the close mode and the post 119 of the lens 103 is located on the low plane 113 of the base 105.

Figure 2B:
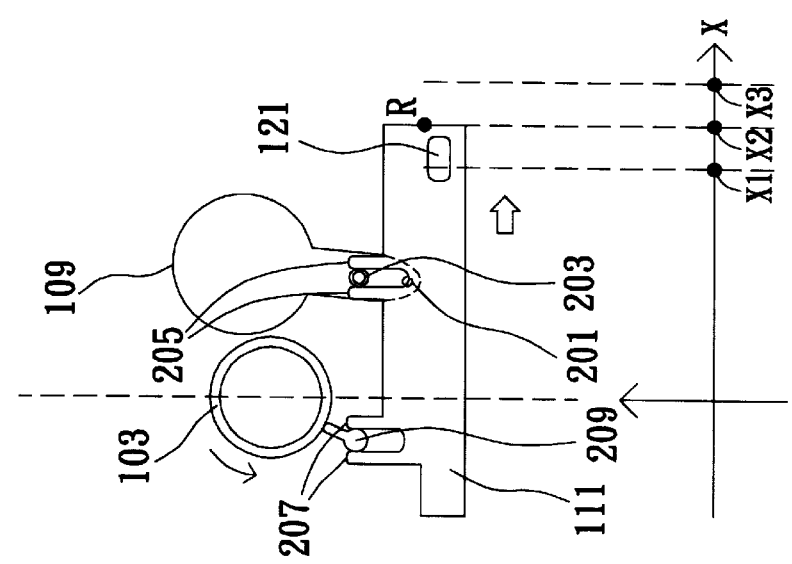
FIG. 2B is a sketch diagram of the lens cap transmission apparatus coupled to the lens cap and the lens when the camera of FIG. 1 is in the open mode.

Then, as shown in FIGS. 2B and 3B, when the reference point R is moved from the close location X1 to the open location X2, the lens cap frame 205 promotes the lens cap pull rod 203 to rotate the lens cap 109 and uncover the lens cap 109 from the lens 103. The camera 100 then switches from the close mode to the open mode. In the meantime, the lens frame 207 also promotes the lens pull rod 209 to enable the lens 103 to rotate along the arrow direction. And as shown in FIG. 3B, the post 119 remains located on the low plane 113.

Figure 2C:
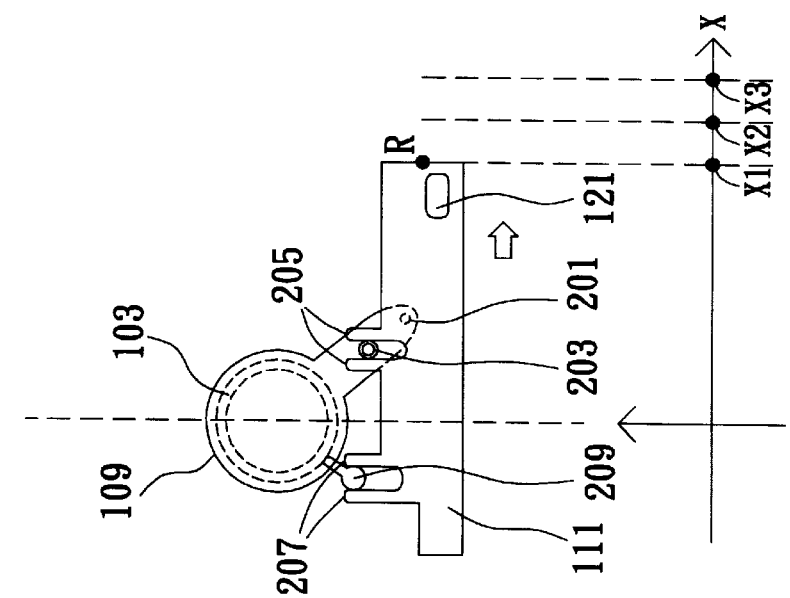
FIG. 2C is a sketch diagram of the lens cap transmission apparatus coupled to the lens cap and the lens when the camera of FIG. 1 is in the close-up mode.

Next, as shown in FIGS. 2C and 3C, when the reference point R is moved from the open location X2 to the close-up location X3, the lens frame 207 promotes the lens pull rod 209 to rotate the lens 103 along the arrow direction. At the same time, the post 119 is moved along the inclined plane 115 to the high plane 117 to enable the lens 103 to move along the direction of the axis of the focalized light. As a result, the focal length of the lens 103 increases and the camera 100 changes from the open mode to the close-up mode.

On the contrary, when the reference point R is moved from the close-up location X3 to the open location X2, the lens frame 207 promotes the lens pull rod 209 to rotate the lens 103 and the post 119 is moved along the inclined plane 115 from the high plane 117 to the low plane 113. In the meantime, the lens 103 is pulled nearer to the light-sensing component 107 by the elasticity of the spring 131. The focal length of the lens 103 is decreased and the camera 100 changes from the close-up mode to the open mode. Then when the reference point R is moved from the open location X2 to the close location X1, the lens cap frame 205 promotes the lens cap pull rod 203 to rotate the lens caps 109 to exactly cover the lens 103. And the camera 100 changes to the close mode.

In the above description of the preferred embodiment, the invention is illustrated by taking the movement of the post 119 of the lens 103 on the base 105 as an example, but it is to be understood that the invention is not limited thereto. Any mechanism for rotating the lens to adjust the focal length of the camera is also an application of the invention. In addition, the above description is illustrated by taking the reference point R on the lens cap transmission apparatus 111 as an example, but the invention is not limited thereto. Any point on the lens cap transmission apparatus 111 can be a reference point of the movement of the lens cap transmission apparatus 111.

The lens cap transmission apparatus disclosed in the preferred embodiment of the invention has the following advantages:

(1) easy usage: A user operates just the lens cap transmission apparatus of the invention to uncover the lens cap, to enable the camera in the open mode, and to adjust the focal length of the lens to shift to the close-up mode. It is different from a traditional camera wherein the user manipulates different or separate buttons to achieve the above functions.

(2) saving inner space of the camera: The invention integrates the open/close button and the close-up button of a traditional camera in order to economize the space within the camera.

(3) reducing the cost of material: The invention integrates the open/close button and the close-up button of a traditional camera in order to economize the material cost of the camera.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens cap transmission apparatus with close-up and start-up functions, equipped in a camera, the camera including a lens and a lens cap, the lens including a lens pull rod for adjusting the focal length of the lens, the lens cap including a lens cap pull rod and coupled to the camera by a fixed spindle, the lens cap transmission apparatus comprising a lens cap frame and a lens frame, the lens cap frame coupled to the lens cap pull rod, the lens frame coupled to the lens pull rod, wherein the lens cap transmission apparatus can move back and forth along a coordinate axis, and the coordinate axis comprises a close location, an open location and a close-up location, the lens cap transmission apparatus being characterized in that when the lens cap transmission apparatus is positioned at the close location, the lens cap covers the lens and the camera is in a close mode, when the lens cap transmission apparatus is positioned at the open location, the lens cap is uncovered from the lens and the camera is in an open mode, and when the lens cap transmission apparatus is positioned at the close-up location, the camera is in a close-up mode.

2. The apparatus according to claim 1, wherein the apparatus further comprises a push button to be pushed by a user to activate the lens cap transmission apparatus.

3. The apparatus according to claim 1, wherein the camera is a digital camera.

4. The apparatus according to claim 1, wherein the focal length of the lens can be changed and the focal length when the lens cap transmission apparatus is positioned at the close-up location is longer than the focal length when the lens cap transmission apparatus is positioned at the open location.

5. A camera with close-up and start-up functions, comprising a lens cap transmission apparatus, a lens, a base, and a lens cap, the lens including a lens pull rod for adjusting the focal length of the lens, the lens cap including a lens cap pull rod and coupled to the camera by a fixed spindle, the lens cap transmission apparatus including a lens cap frame and a lens frame, the lens cap frame coupled to the lens cap pull rod, the lens frame coupled to the lens pull rod, the lens cap transmission apparatus comprising:

a coordinate axis, along which the lens cap transmission apparatus is capable of moving back and forth, the coordinate axis comprising a close location, an open location and a close-up location;

wherein when the lens cap transmission apparatus is positioned at the close location, the lens cap covers the lens and the camera is in a close mode, when the lens cap transmission apparatus is positioned at the open location, the lens cap is uncovered from the lens and the camera is in an open mode, and when the lens cap transmission apparatus is positioned at the close-up location, the camera is in a close-up mode.

6. The camera according to claim 5, wherein the lens cap transmission apparatus further comprises a push button to be pushed by a user to activate the lens cap transmission apparatus.

7. The camera according to claim 5, wherein the camera is a digital camera.

8. The camera according to claim 5, wherein the lens further comprises a post, and when the lens cap transmission apparatus is positioned at the close location or the open location, the post shores up a low plane of the base.

9. The camera according to claim 8, wherein when the lens cap transmission apparatus is positioned at the close-up location, the post shores up a high plane of the base to lengthen the focal length of the lens, and thus the focal length when the post shores up the high plane is longer than the focal length when the post shores up the low plane.

* * * * *